(12) United States Patent
Li et al.

(10) Patent No.: US 9,766,354 B2
(45) Date of Patent: Sep. 19, 2017

(54) SEMICONDUCTOR DETECTOR

(71) Applicants: NUCTECH COMPANY LIMITED, Beijing (CN); TSINGHUA UNIVERSITY, Beijing (CN)

(72) Inventors: Yuanjing Li, Beijing (CN); Lan Zhang, Beijing (CN); Yulan Li, Beijing (CN); Yinong Liu, Beijing (CN); Jianqiang Fu, Beijing (CN); Hao Jiang, Beijing (CN); Zhi Deng, Beijing (CN); Tao Xue, Beijing (CN); Wei Zhang, Beijing (CN); Jun Li, Beijing (CN)

(73) Assignees: NUCTECH COMPANY LIMITED, Beijing (CN); TSINGHUA UNIVERSITY, Bejing (CN)

( * ) Notice: Subject to any disclaimer, the term of this patent is extended or adjusted under 35 U.S.C. 154(b) by 0 days.

(21) Appl. No.: 14/152,332

(22) Filed: Jan. 10, 2014

(65) Prior Publication Data

US 2014/0319635 A1 Oct. 30, 2014

(30) Foreign Application Priority Data

Apr. 26, 2013 (CN) .......................... 2013 1 0149397
Apr. 26, 2013 (CN) ..................... 2013 2 0218487 U

(51) Int. Cl.
*G01T 3/08* (2006.01)
*G01T 1/36* (2006.01)
*G01T 1/24* (2006.01)

(52) U.S. Cl.
CPC .............. *G01T 1/366* (2013.01); *G01T 1/241* (2013.01); *G01T 3/08* (2013.01)

(58) Field of Classification Search
CPC .... G01T 3/08; G01T 1/36; G01T 1/24; G01T 1/29
(Continued)

(56) References Cited

U.S. PATENT DOCUMENTS

| 4,210,805 A | 7/1980 | Kobayashi et al. |
| 5,905,264 A | 5/1999 | Shahar et al. |

(Continued)

FOREIGN PATENT DOCUMENTS

| CN | 101576516 | 11/2009 |
| CN | 101577284 | 11/2009 |

(Continued)

OTHER PUBLICATIONS

EP Search Report mailed Jul. 22, 2014 from EP Patent Application No. 14150977.8.
(Continued)

*Primary Examiner* — Tran Tran
(74) *Attorney, Agent, or Firm* — Casimir Jones, S.C.

(57) ABSTRACT

The invention provides a semiconductor detector, and the semiconductor detector comprises a semiconductor crystal, a cathode, an anode and at least one ladder electrode; the semiconductor crystal comprises a top surface, a bottom surface and at least one side; the cathode, the anode and the ladder electrode are conductive thin films deposited on a surface of the semiconductor crystal; the cathode is disposed on the bottom surface of the semiconductor crystal, the anode is disposed on the top surface of the semiconductor crystal, the ladder electrode is disposed on the at least one side of the semiconductor crystal; and the ladder electrode comprises a plurality of sub-electrodes. As compared to the prior art, the semiconductor detector can improve the energy resolution.

22 Claims, 7 Drawing Sheets

(58) Field of Classification Search
USPC .......................................................... 257/429
See application file for complete search history.

(56) References Cited

U.S. PATENT DOCUMENTS

| | | | |
|---|---|---|---|
| 6,037,595 | A | 3/2000 | Lingren |
| 6,069,360 | A | 5/2000 | Lund |
| 6,175,120 | B1 | 1/2001 | McGregor |
| 2005/0098730 | A1* | 5/2005 | Yokoi ............... H01L 27/14603 250/370.01 |
| 2008/0149844 | A1 | 6/2008 | Chen et al. |
| 2009/0072156 | A1* | 3/2009 | Chinn ................... G01T 1/2985 250/363.04 |
| 2011/0108703 | A1 | 5/2011 | Dofran |

FOREIGN PATENT DOCUMENTS

| | | |
|---|---|---|
| CN | 101858983 | 10/2010 |
| CN | 103235332 | 8/2013 |
| CN | 203204163 | 9/2013 |
| EP | 1 351 309 | 10/2003 |
| EP | 1351309 | 10/2003 |
| EP | 1351309 A2 | 10/2003 |
| JP | 2010-93071 | 4/2010 |

OTHER PUBLICATIONS

Ishikawa, Shin-Nosuke et al., "Development of Double-Sided CdTe Strip Detectors for y-Ray Imaging and Spectroscopy," Japanese Journal of Applied Physics, Japan Society of Applied Physics, JP, vol. 49, No. 11, Nov. 1, 2010, pp. 116702-1.

Office Action dated Jun. 2, 2016 from Chinese Patent Application No. 201310149397.6.

* cited by examiner

SEMICONDUCTOR DETECTOR

CROSS-REFERENCE TO RELATED APPLICATION

The present application claims priority to pending Chinese Patent Application No. CN201310149397.6, filed Apr. 26, 2013 and to pending Chinese Patent Application No. CN201320218487.1, filed Apr. 26, 2013, the contents of which are incorporated by reference their entireties.

BACKGROUND OF THE INVENTION

Utilizing a detector to measure the energy spectrum of high energy rays such as X rays or γ rays is one of important means for nuclide recognition. Such a detector has been widely applied in the fields of nuclear radiation protection, nuclear security inspection, environmental protection and homeland security, etc. for detecting radioactive substances. In the prior art, such a detector is mainly divided into two classes: one is a scintillator detector with NaI (Tl) as a representative, and the other is a semiconductor detector with high purity germanium (HPGe) as a representative.

The scintillator detector has the advantages of simple manufacturing and low price. A portable γ spectrometer used in the detection site is usually a NaI or CsI scintillator detector. However, the energy resolution of the scintillator detector is poor, with an energy resolution of 6%-7%@662 keV, which cannot meet the measurement requirement for the fine structure of a complex energy spectrum.

The energy resolution of the high purity germanium semiconductor detector is higher than that of the scintillator detector. However, the high purity germanium semiconductor detector can only be preserved and used at liquid nitrogen temperature (77 K), and cannot be used at room temperature. On the one hand, it is necessary for the high purity germanium semiconductor detector to be equipped with a cryogenic container and a vacuum chamber, which results in its increased volume and cost. On the other hand, when the high purity germanium semiconductor detector is used, it is necessary to frequently add liquid nitrogen, causing it to be unable to meet the requirement for use in field detection site, and its range of usage is limited.

In recent years, another semiconductor detector has appeared which can work at room temperature, and such a semiconductor detector uses a semiconductor crystal whose material is $HgI_2$, GaAs, TiBr, CdTe, CdZnTe (Cadmium zinc telluride, abbreviated as CZT), CdSe, GaP, HgS, $PbI_2$, or AlSb. Such a semiconductor detector has the advantages of a small volume, being easy to carry, high energy resolution, high detection efficiency and being capable of working at room temperature. Currently, such a semiconductor detector has been widely applied in the fields of environmental monitoring, nuclear medicine, industrial non-destructive detection, security inspection, nuclear weapon penetration, aeronautics and astronautics, astrophysics and high energy physics, etc.

The forbidden band of the CdZnTe semiconductor crystal is 1.57 eV, its impedance is as high as $10^{10}$ Ω/cm, its average atomic number is 49.1, its density is 5.78 g/cm³, the energy needed for generating one electron-hole pair is 4.64 eV, and it is the only semiconductor material which can work at room temperature and deal with 2 million photons/(s·mm²). Studies have shown that, a semiconductor detector using CdZnTe semiconductor crystals has the best performance and is most suitable for use at room temperature.

As compared to the scintillator detector, the energy resolution of the CdZnTe detector is improved, and its energy resolution is evidently higher than that of the NaI scintillator detector. As compared to the HPGe detector, the forbidden band of the CdZnTe detector is broader, its impedance is larger, its carrier concentration is lower, which makes its dark current smaller after a bias voltage is applied, and it is a semiconductor detector which can work at room temperature.

However, the CdZnTe crystal is generally inhomogeneous, and there are structural defects in it, therefore, the carrier mobility of the CdZnTe crystal is low, the carrier drift time is long, and the carrier (especially the hole) trapping phenomenon is easily produced, namely, the carrier lifetime is short. The carrier trapping phenomenon results in that the energy resolution of the CdZnTe semiconductor detector is reduced, and there occurs a low-energy tail phenomenon in the energy spectrum obtained by measuring by employing the CdZnTe semiconductor detector.

To improve the energy resolution of the CdZnTe semiconductor detector, the CdZnTe semiconductor detector generally employs an electrode having a unipolar charge sensitive characteristic. Such an electrode forms an electric field, and electrons and holes generated through interaction between high energy rays and the crystal move in different directions under the effect of the electric field, wherein the electrons move towards an anode, and the holes move towards a cathode. Since the weighting potential at a position far away from a collecting electrode is very small, the contribution to an induced signal from the movement of the holes at a position far away from the collecting electrode is quite small and the induced signal is mainly contributed by the electrons, thereby realizing a unipolar charge sensitive semiconductor detector. In the prior art, a CdZnTe semiconductor detector based on the unipolar charge sensitive characteristic mainly comprises the following types: Parallel Frisch Grid, Coplanar Frisch Grid, Hemisphere, CAPture, Quasi-hemisphere, and Pixelated, etc.

The unipolar charge sensitive semiconductor detector may reduce to a certain extent the adverse effect on the energy resolution due to a low migration rate and a short lifetime of a hole. However, a moving electron will also be trapped under the effect of the defect of the CdZnTe semiconductor crystal, and especially in the case of the electric field intensity being weak and the drift time being long, it is significant that electrons are trapped, which results in a fluctuation of the amplitude of the output signal of the collecting electrode of the CdZnTe semiconductor detector, thereby affecting the energy resolution of the CdZnTe semiconductor detector.

From the above, there is a need for further improving the energy resolution of the CdZnTe semiconductor detector.

SUMMARY OF THE INVENTION

An object of the invention is to provide a semiconductor detector.

The semiconductor detector provided by the invention comprises a semiconductor crystal, a cathode, an anode and at least one ladder electrode;

the semiconductor crystal comprises a top surface, a bottom surface and at least one side; the cathode, the anode and the ladder electrode are conductive thin films deposited on a surface of the semiconductor crystal;

the cathode is disposed on the bottom surface of the semiconductor crystal, the anode is disposed on the top surface of the semiconductor crystal, and the ladder electrode is disposed on the at least one side of the semiconductor crystal; and the ladder electrode comprises a plurality of sub-electrodes.

Preferably, the shape of the semiconductor crystal is a cuboid.

Preferably, the anode is rectangular and covers a partial area at a middle position of the top surface; the semiconductor detector comprises a first ladder electrode and a second ladder electrode; the first ladder electrode and the second ladder electrode are disposed respectively on a first side and a second side of the semiconductor crystal with their positions being opposite.

Preferably, the cathode covers the full area of the bottom surface.

Preferably, the cathode comprises a plurality of rectangular sub-electrodes uniformly disposed on the bottom surface, and a gap is disposed between any two adjacent sub-electrodes thereof.

Preferably, the long sides of a sub-electrode of the cathode are parallel to the long sides of the anode.

Preferably, the long sides of a sub-electrode of the cathode are perpendicular to the long sides of the anode.

Preferably, the first ladder electrode comprises a plurality of rectangular sub-electrodes uniformly disposed on the first side, and a gap is disposed between any two adjacent sub-electrodes thereof; the second ladder electrode comprises a plurality of sub-electrodes uniformly disposed on the second side, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

Preferably, the first ladder electrode comprises a plurality of rectangular sub-electrodes uniformly disposed on the first side and in a partial area of the top surface adjacent to the first side, and a gap is disposed between any two adjacent sub-electrodes thereof; the second ladder electrode comprises a plurality of sub-electrodes uniformly disposed on the second side and in a partial area of the top surface adjacent to the second side, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

Preferably, the edges where the bottom surface of the semiconductor crystal joins the first side and the second side are chamfered, and the cathode covers the full area of the chamfered bottom surface of the semiconductor crystal.

Preferably, the first ladder electrode comprises a plurality of rectangular sub-electrodes uniformly disposed on the first side, and a gap is disposed between any two adjacent sub-electrodes thereof; the second ladder electrode comprises a plurality of sub-electrodes uniformly disposed on the second side, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

Preferably, the profile of the semiconductor crystal is fan-shaped, the bottom surface is an arc-shaped surface, the top surface is rectangular, and the anode is disposed on the top surface and covers the full area of the top surface.

Preferably, the semiconductor detector comprises a first ladder electrode and a second ladder electrode; and the first ladder electrode and the second ladder electrode are disposed respectively on a first side and a second side of the semiconductor crystal with their positions being opposite.

Preferably, the first ladder electrode comprises a plurality of rectangular sub-electrodes uniformly disposed on the first side, and a gap is disposed between any two adjacent sub-electrodes thereof; the second ladder electrode comprises a plurality of sub-electrodes uniformly disposed on the second side, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

Preferably, the anode is circular or elliptic and covers a partial area at a middle position of the top surface; the cathode covers the full area of the bottom surface; the semiconductor detector comprises a first ladder electrode, a second ladder electrode, a third ladder electrode, and a fourth ladder electrode; the first ladder electrode and the second ladder electrode are disposed respectively on a first side and a second side of the semiconductor crystal with their positions being opposite, and the third ladder electrode and the fourth ladder electrode are disposed respectively on a third side and a fourth side of the semiconductor crystal with their positions being opposite.

Preferably, the first ladder electrode comprises a plurality of rectangular sub-electrodes uniformly disposed on the first side, and a gap is disposed between any two adjacent sub-electrodes thereof; the second ladder electrode, the third ladder electrode and the fourth ladder electrode in turn comprise a plurality of sub-electrodes uniformly disposed on the second side, the third side and the fourth side respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode; sub-electrodes with the same height of the first ladder electrode, the second ladder electrode, the third ladder electrode and the fourth ladder electrode are connected with each other to form a loop.

Preferably, the shape of the semiconductor crystal is a cylinder.

Preferably, the anode is circular or elliptic and covers a partial area at a middle position of the top surface; the cathode covers the full area of the bottom surface; the semiconductor detector comprises a first ladder electrode; the first ladder electrode is disposed on a first side of the semiconductor crystal.

Preferably, the first ladder electrode comprises a plurality of annular sub-electrodes uniformly disposed on the first side, and a gap is disposed between any two adjacent sub-electrodes thereof; the sub-electrodes of the first ladder electrode are parallel to the top surface.

Preferably, the anode is rectangular and covers the full area of the top surface; the cathode covers the full area of the bottom surface; the semiconductor detector comprises a first ladder electrode, a second ladder electrode, a third ladder electrode, and a fourth ladder electrode; the first ladder electrode and the second ladder electrode are disposed respectively on a first side and a second side of the semiconductor crystal with their positions being opposite, and the third ladder electrode and the fourth ladder electrode are disposed respectively on a third side and a fourth side of the semiconductor crystal with their positions being opposite.

Preferably, the first ladder electrode comprises a plurality of rectangular sub-electrodes uniformly disposed on the first side, and a gap is disposed between any two adjacent sub-electrodes thereof; the second ladder electrode, the third ladder electrode and the fourth ladder electrode in turn comprise a plurality of sub-electrodes uniformly disposed on the second side, the third side and the fourth side respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode; sub-electrodes with the same height of the first ladder electrode, the second ladder electrode, the third ladder electrode and the fourth ladder electrode are connected with each other to form a loop.

Preferably, the first ladder electrode comprises a plurality of rectangular sub-electrodes uniformly disposed on the first side, and a gap is disposed between any two adjacent sub-electrodes thereof; the second ladder electrode, the third ladder electrode and the fourth ladder electrode in turn comprise a plurality of sub-electrodes uniformly disposed on the second side, the third side and the fourth side respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode; sub-electrodes with the same height of two of the ladder electrodes disposed on any two adjacent ones of the sides of the semiconductor crystal are provided with openings at the connection of the two sides.

Preferably, the material of the semiconductor crystal comprises $HgI_2$, GaAs, TiBr, CdTe, CdZnTe, CdSe, GaP, HgS, $PbI_2$, or AlSb.

Preferably, the material of the cathode, the anode and the ladder electrode comprises Au, Pt, Ag, Cu, Al or ITO.

The invention has the following beneficial effects:
the semiconductor detector of the invention employs the technique of the unipolar charge sensitivity in the prior art, the average electric field intensity inside the semiconductor crystal is strengthened by arranging the ladder electrode, the increase of the average electric field intensity causes the carrier drift time to be shortened, and the shortening of the carrier drift time causes the possibility of a carrier being trapped to be lowered, thereby causing the improvement of the energy resolution of the semiconductor detector.

DETAILED DESCRIPTION OF THE INVENTION

The inventive content of the invention will be further described in detail in the following with reference to the drawings and embodiments.

Embodiment 1

Figure 1:
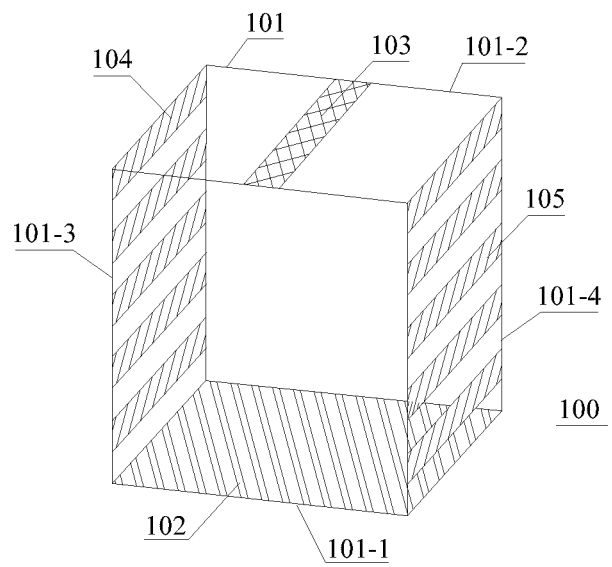
FIG. 1 is a structural schematic diagram of a semiconductor detector provided by an embodiment 1 of the invention.

As shown in FIG. 1, a semiconductor detector 100 provided by this embodiment comprises a semiconductor crystal 101, a cathode 102, an anode 103, a first ladder electrode 104 and a second ladder electrode 105.

In this embodiment, the shape of the semiconductor crystal 101 is a cuboid. The material of the semiconductor crystal 101 comprises $HgI_2$, GaAs, TiBr, CdTe, CdZnTe, CdSe, GaP, HgS, $PbI_2$, or AlSb.

In this embodiment, the cathode 102, the anode 103, the first ladder electrode 104 and the second ladder electrode 105 are conductive thin films deposited on a surface of the semiconductor crystal 101. The material of the cathode 102, the anode 103, the first ladder electrode 104 and the second ladder electrode 105 comprises Au, Pt, Ag, Cu, Al or ITO. The cathode 102 is disposed on a bottom surface 101-1 of the semiconductor crystal 101, and covers the full area of the bottom surface 101-1 of the semiconductor crystal 101. The anode 103 is disposed on a top surface 101-2 of the semiconductor crystal 101, and covers a partial area at a middle position of the top surface 101-2. Preferably, the anode 103 is rectangular, the two relatively short sides of the anode 103 coincide with the two relatively long sides of the top surface 101-2 respectively, namely, the long sides of the anode 103 are equal to the short sides of the top surface 101-2; the two relatively long sides of the anode 103 are parallel to the two relatively short sides of the top surface 101-2.

In this embodiment, the first ladder electrode 104 is disposed on a first side 101-3 of the semiconductor crystal 101, the second ladder electrode 105 is disposed on a second side 101-4 of the semiconductor crystal 101, and the positions of the first side 101-3 and the second side 101-4 are opposite to each other. The first ladder electrode 104 comprises a plurality of rectangular sub-electrodes disposed on the first side 101-3, and a gap is disposed between any two adjacent sub-electrodes thereof. The second ladder electrode 105 is disposed on the second side 101-4 of the semiconductor crystal 101, and a gap is disposed between any two adjacent sub-electrodes thereof. The individual sub-electrodes of the first ladder electrode 104 may be non-uniformly disposed on the first side 101-3. The individual sub-electrodes of the second ladder electrode 105 may be non-uniformly disposed on the second side 101-4. Preferably, the individual sub-electrodes of the first ladder electrode 104 are uniformly disposed on the first side 101-3. The individual sub-electrodes of the second ladder electrode 105 are uniformly disposed on the second side 101-4. The width of the individual sub-electrodes of the first ladder electrode 104 may be different. The width of the individual sub-electrodes of the second ladder electrode 105 may be different. Preferably, the width of the individual sub-electrodes of the first ladder electrode 104 is identical. The width of the individual sub-electrodes of the second ladder electrode 105 is identical. The number and shape of the sub-electrodes of the second ladder electrode 105 may be different from those of the sub-electrodes of the first ladder electrode 104. Preferably, the number and shape of the sub-electrodes of the second ladder electrode 105 are the same as those of the sub-electrodes of the first ladder electrode 104, and the positions of the sub-electrodes of the second ladder electrode 105 are opposite one by one to those of the sub-electrodes of the first ladder electrode 104. Preferably, the long sides of the sub-electrodes of the first ladder electrode 104 and the second ladder electrode 105 are parallel to the long sides of the anode 103.

When the energy spectrum of high energy rays is measured by applying the semiconductor detector of this embodiment, a ladder bias voltage is applied on the first ladder electrode 104 and the second ladder electrode 105. In particular, according to an order from the cathode 102 to the anode 103, the voltages applied on the individual sub-electrodes of the first ladder electrode 104 and the second ladder electrode 105 rise in turn. Preferably, the voltages applied on any two sub-electrodes with the same height of the first ladder electrode 104 and the second ladder electrode 105 are equal.

The semiconductor detector provided by this embodiment causes the average electric field intensity inside the semiconductor crystal 101 to be increased by arranging the two ladder electrodes, the increase of the average electric field intensity causes the carrier drift time to be shortened, and the shortening of the carrier drift time causes the possibility of carriers being trapped to be lowered, thereby causing the improvement of the energy resolution of the semiconductor detector of this embodiment.

Figure 2:
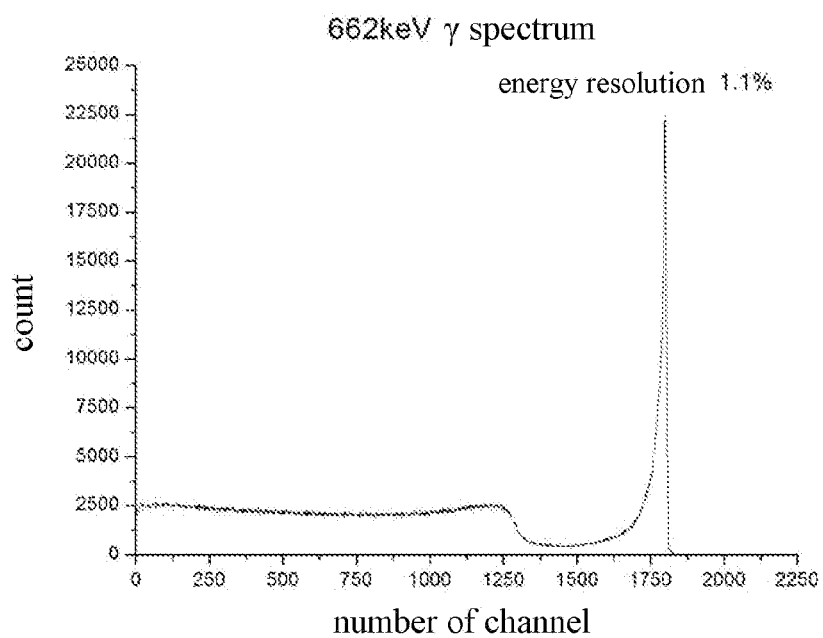
FIG. 2 is an energy spectrum plot obtained by measuring γ rays of 662 KeV employing the semiconductor detector of the embodiment 1.

FIG. 2 is an energy spectrum plot obtained by measuring γ rays of 662 KeV employing the semiconductor detector 100 of this embodiment. From FIG. 2, it can be seen that a distinct 662 KeV full energy peak appears in the γ energy spectrum of the semiconductor detector 100 of this embodiment, and the energy resolution thereof is 1.1%@662 keV. This sufficiently shows that the energy resolution of the semiconductor detector 100 of this embodiment is improved evidently as compared to the semiconductor detector in the prior art.

Embodiment 2

Figure 3:
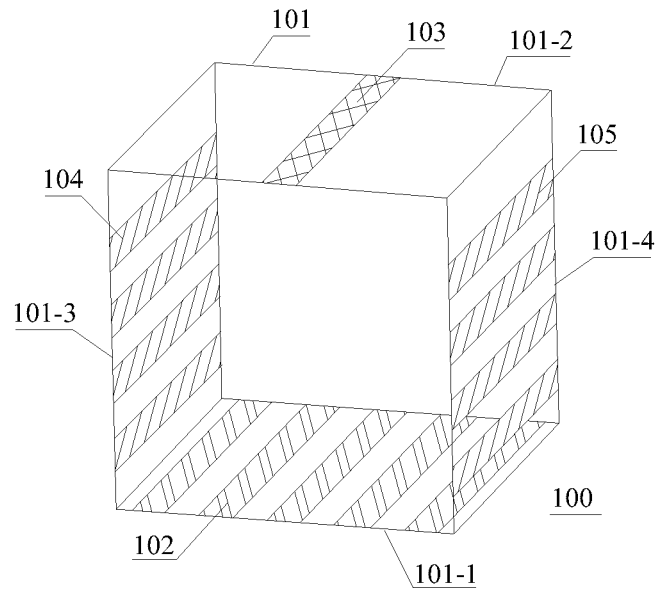
FIG. 3 is a structural schematic diagram of a semiconductor detector provided by an embodiment 2 of the invention.

As shown in FIG. 3, the differences between the semiconductor detector 100 provided by this embodiment and the embodiment 1 lie in that the cathode 102 comprises a plurality of rectangular sub-electrodes disposed on the bottom surface 101-1, and a gap is disposed between any two adjacent sub-electrodes thereof, and the long sides of each sub-electrode of the cathode 102 are parallel to the long sides of the anode 103. The individual sub-electrodes of the cathode 102 may be non-uniformly disposed on the bottom surface 101-1. Preferably, the individual sub-electrodes of the cathode 102 are uniformly disposed on the bottom surface 101-1. The width of the individual sub-electrodes of the cathode 102 may be different. Preferably, the width of the individual sub-electrodes of the cathode 102 is identical. The rest is the same as the embodiment 1.

Embodiment 3

Figure 4:
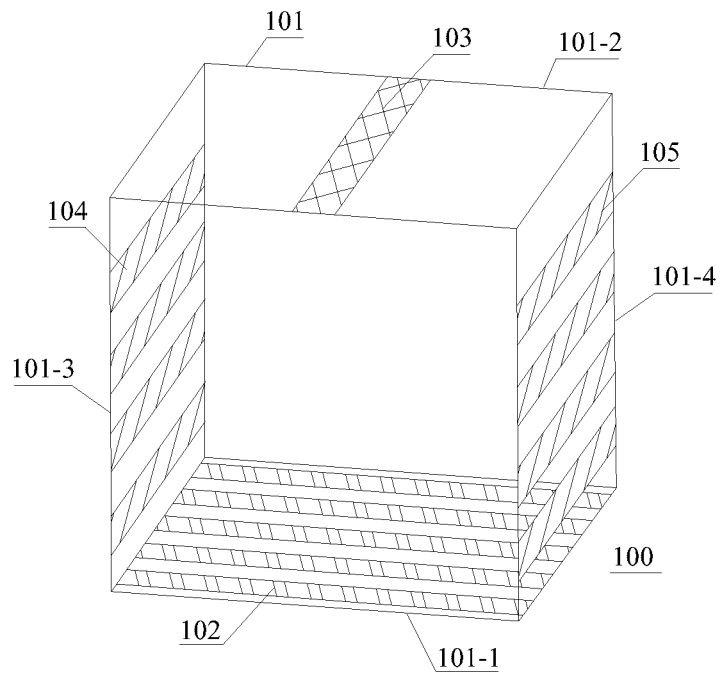
FIG. 4 is a structural schematic diagram of a semiconductor detector provided by an embodiment 3 of the invention.

As shown in FIG. 4, the differences between the semiconductor detector 100 provided by this embodiment and the embodiment 1 lie in that the cathode 102 comprises a plurality of rectangular sub-electrodes disposed on the bottom surface 101-1, and a gap is disposed between any two adjacent sub-electrodes thereof, and the long sides of each sub-electrode of the cathode 102 are perpendicular to the long sides of the anode 103. The individual sub-electrodes of the cathode 102 may be non-uniformly disposed on the bottom surface 101-1. Preferably, the individual sub-electrodes of the cathode 102 are uniformly disposed on the bottom surface 101-1. The width of the individual sub-electrodes of the cathode 102 may be different. Preferably, the width of the individual sub-electrodes of the cathode 102 is identical. The rest is the same as the embodiment 1.

Embodiment 4

Figure 5:
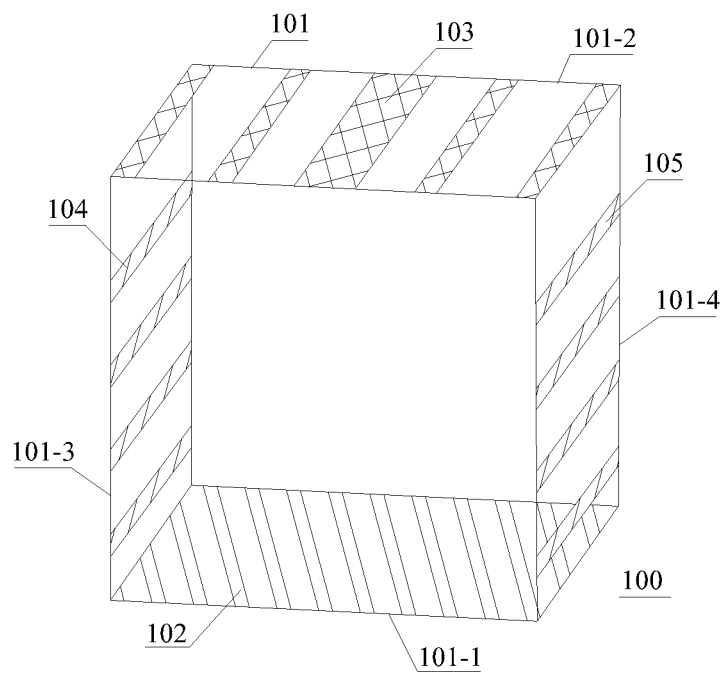
FIG. 5 is a structural schematic diagram of a semiconductor detector provided by an embodiment 4 of the invention.

As shown in FIG. 5, the differences between the semiconductor detector 100 provided by this embodiment and the embodiment 1 lie in that the first ladder electrode 104 is disposed on the first side 101-3 of the semiconductor crystal 101 and in a partial area of the top surface 101-2 adjacent to the first side 101-3, i.e., partial sub-electrodes of the first ladder electrode 104 are disposed on the first side 101-3, and the remaining partial sub-electrodes are disposed in a partial area of the top surface 101-2 adjacent to the first side 101-3; the second ladder electrode 105 is disposed on the second side 101-4 of the semiconductor crystal 101 and in a partial area of the top surface 101-2 adjacent to the second side 101-4, i.e., partial sub-electrodes of the second ladder electrode 105 are disposed on the second side 101-4, and the remaining partial sub-electrodes are disposed in a partial area of the top surface 101-2 adjacent to the second side 101-4. The rest is the same as the embodiment 1.

Embodiment 5

Figure 6:
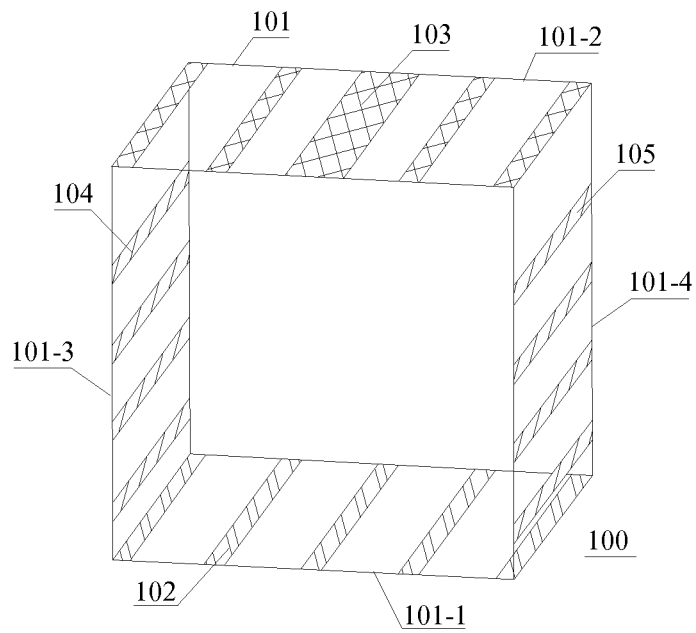
FIG. 6 is a structural schematic diagram of a semiconductor detector provided by an embodiment 5 of the invention.

As shown in FIG. 6, the differences between the semiconductor detector 100 provided by this embodiment and the embodiment 1 lie in that the first ladder electrode 104 is disposed on the first side 101-3 of the semiconductor crystal 101 and in a partial area of the top surface 101-2 adjacent to the first side 101-3, i.e., partial sub-electrodes of the first ladder electrode 104 are disposed on the first side 101-3, and the remaining partial sub-electrodes are disposed in a partial area of the top surface 101-2 adjacent to the first side 101-3; the second ladder electrode 105 is disposed on the second side 101-4 of the semiconductor crystal 101 and in a partial area of the top surface 101-2 adjacent to the second side 101-4, i.e., partial sub-electrodes of the second ladder electrode 105 are disposed on the second side 101-4, and the remaining partial sub-electrodes are disposed in a partial area of the top surface 101-2 adjacent to the second side 101-4; the cathode 102 comprises a plurality of rectangular sub-electrodes disposed on the bottom surface 101-1, and a gap is disposed between any two adjacent sub-electrodes thereof, and the long sides of each sub-electrode of the cathode 102 are parallel to the long sides of the anode 103. The individual sub-electrodes of the cathode 102 may be non-uniformly disposed on the bottom surface 101-1. Preferably, the individual sub-electrodes of the cathode 102 are uniformly disposed on the bottom surface 101-1. The width of the individual sub-electrodes of the cathode 102 may be different. Preferably, the width of the individual sub-electrodes of the cathode 102 is identical. The rest is the same as the embodiment 1.

Embodiment 6

Figure 7:
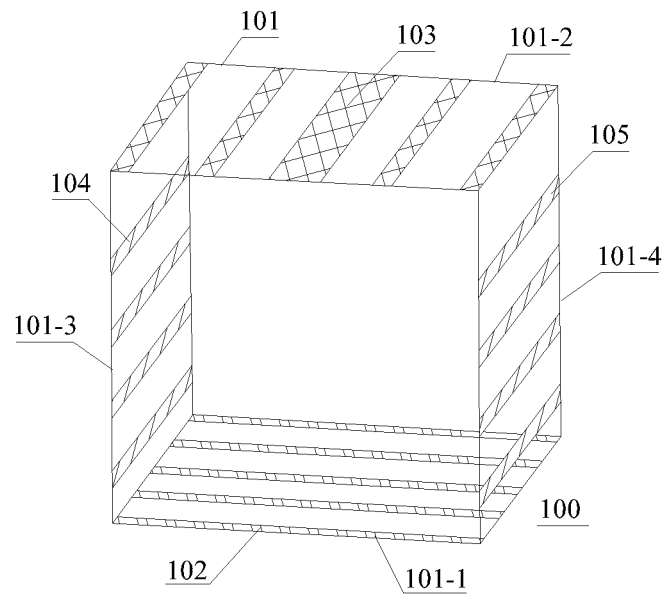
FIG. 7 is a structural schematic diagram of a semiconductor detector provided by an embodiment 6 of the invention.

As shown in FIG. 7, the differences between the semiconductor detector 100 provided by this embodiment and the embodiment 1 lie in that the first ladder electrode 104 is disposed on the first side 101-3 of the semiconductor crystal 101 and in a partial area of the top surface 101-2 adjacent to the first side 101-3, i.e., partial sub-electrodes of the first ladder electrode 104 are disposed on the first side 101-3, and the remaining partial sub-electrodes are disposed in a partial area of the top surface 101-2 adjacent to the first side 101-3; the second ladder electrode 105 is disposed on the second side 101-4 of the semiconductor crystal 101 and in a partial area of the top surface 101-2 adjacent to the second side 101-4, i.e., partial sub-electrodes of the second ladder electrode 105 are disposed on the second side 101-4, and the remaining partial sub-electrodes are disposed in a partial area of the top surface 101-2 adjacent to the second side 101-4; the cathode 102 comprises a plurality of rectangular sub-electrodes disposed on the bottom surface 101-1, and a gap is disposed between any two adjacent sub-electrodes thereof, and the long sides of each sub-electrode of the cathode 102 are perpendicular to the long sides of the anode 103. The individual sub-electrodes of the cathode 102 may be non-uniformly disposed on the bottom surface 101-1. Preferably, the individual sub-electrodes of the cathode 102 are uniformly disposed on the bottom surface 101-1. The width of the individual sub-electrodes of the cathode 102 may be different. Preferably, the width of the individual sub-electrodes of the cathode 102 is identical. The rest is the same as the embodiment 1.

Embodiment 7

Figure 8:
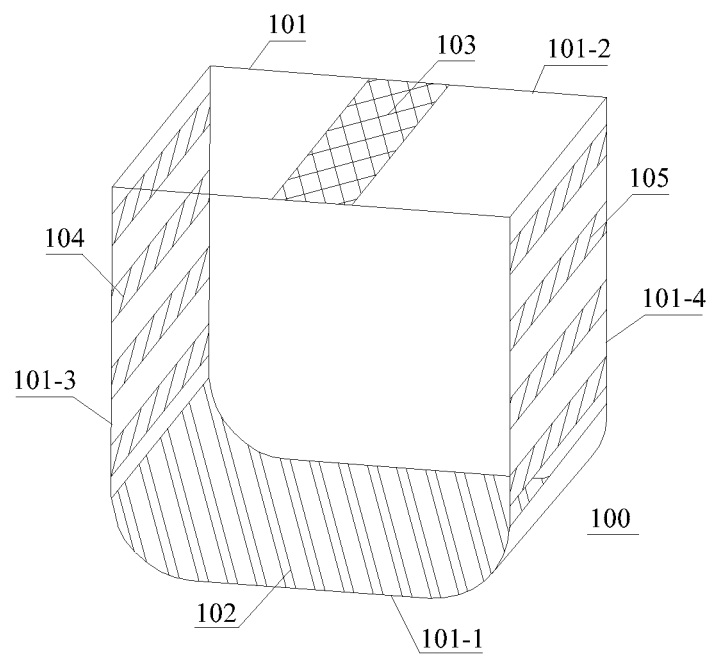
FIG. 8 is a structural schematic diagram of a semiconductor detector provided by an embodiment 7 of the invention.

As shown in FIG. 8, the differences between the semiconductor detector 100 provided by this embodiment and the embodiment 1 lie in that the edges where the bottom surface 101-1 of the semiconductor crystal 101 joins the first side 101-3 and the second side 101-4 are chamfered, and the cathode 102 covers the full area of the chamfered bottom surface 101-1 of the semiconductor crystal 101. The rest is the same as the embodiment 1.

Embodiment 8

Figure 9:
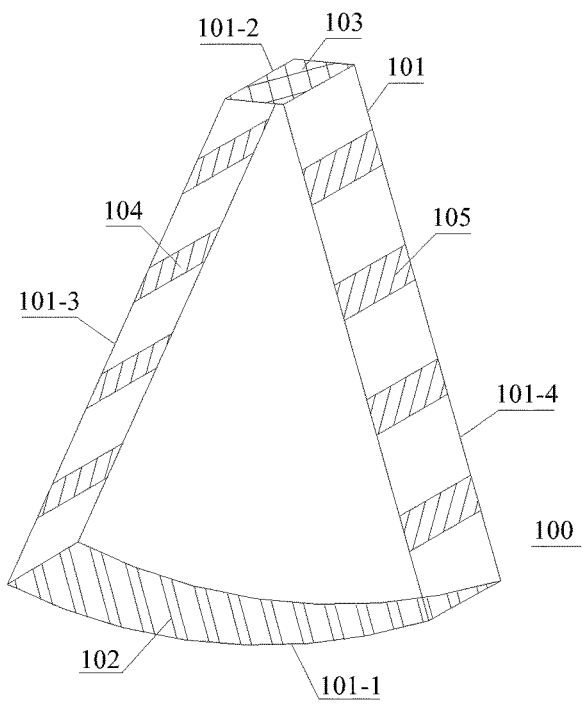
FIG. 9 is a structural schematic diagram of a semiconductor detector provided by an embodiment 8 of the invention.

As shown in FIG. 9, the differences between the semiconductor detector 100 provided by this embodiment and the embodiment 1 lie in that the profile of the semiconductor crystal 101 is fan-shaped, its bottom surface 101-1 is an arc-shaped surface, its top surface 101-2 is rectangular, and the anode 103 is disposed on the top surface 101-2 of the semiconductor crystal 101 and covers the full area of the top surface 101-2. The rest is the same as the embodiment 1.

Embodiment 9

Figure 10:
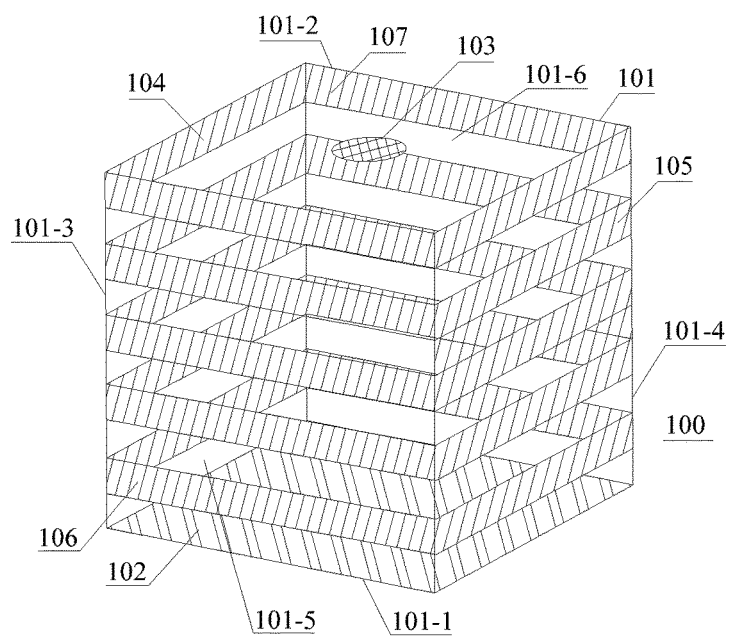
FIG. 10 is a structural schematic diagram of a semiconductor detector provided by an embodiment 9 of the invention.

As shown in FIG. 10, the differences between the semiconductor detector 100 provided by this embodiment and the embodiment 1 lie in that the semiconductor detector 100 provided by this embodiment comprises a semiconductor crystal 101, a cathode 102, an anode 103, a first ladder electrode 104, a second ladder electrode 105, a third ladder electrode 106 and a fourth ladder electrode 107; the anode 103 is circular or elliptic; the third ladder electrode 106 is disposed on a third side 101-5 of the semiconductor crystal 101, the fourth ladder electrode 107 is disposed on a fourth side 101-6 of the semiconductor crystal 101, and the positions of the third side 101-5 and the fourth side 101-6 are opposite to each other; the third ladder electrode 106 comprises a plurality of rectangular sub-electrodes uniformly disposed on the third side 101-5, and a gap is disposed between any two adjacent sub-electrodes thereof; the fourth ladder electrode 107 comprises a plurality of sub-electrodes uniformly disposed on the fourth side 101-6, the number and shape of the sub-electrodes of the third ladder electrode 106 and the fourth ladder electrode 107 are the same as those of the sub-electrodes of the first ladder electrode 104, and the positions of the sub-electrodes of the third ladder electrode 106 are opposite one by one to those of the sub-electrodes of the fourth ladder electrode 107; sub-electrodes with the same height of the first ladder electrode 104, the second ladder electrode 105, the third ladder electrode 106 and the fourth ladder electrode 107 are connected with each other to form a loop. The width of the individual sub-electrodes of the first ladder electrode 104 may be different. The width of the individual sub-electrodes of the second ladder electrode 105 may be different. The width of the individual sub-electrodes of the third ladder electrode 106 may be different. The width of the individual sub-electrodes of the fourth ladder electrode 107 may be different. Preferably, the width of the individual sub-electrodes of the first ladder electrode 104 is identical. The width of the individual sub-electrodes of the second ladder electrode 105 is identical. The width of the individual sub-electrodes of the third ladder electrode 106 is identical. The width of the individual sub-electrodes of the fourth ladder electrode 107 is identical. More preferably, the width of all the sub-electrodes of the first ladder electrode 104, the second ladder electrode 105, the third ladder electrode 106 and the fourth ladder electrode 107 is identical. The rest is the same as the embodiment 1.

Embodiment 10

Figure 11:
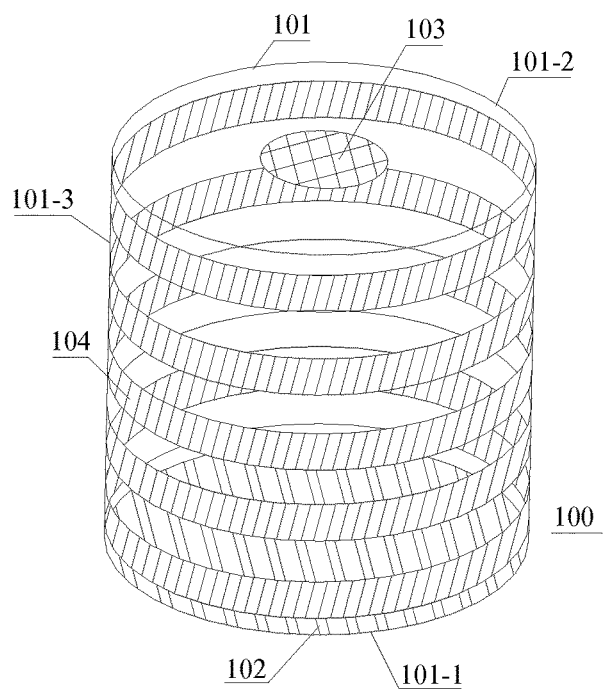
FIG. 11 is a structural schematic diagram of a semiconductor detector provided by an embodiment 10 of the invention.

As shown in FIG. 11, the differences between the semiconductor detector 100 provided by this embodiment and the embodiment 1 lie in that the semiconductor detector 100 provided by this embodiment comprises a semiconductor crystal 101, a cathode 102, an anode 103 and a first ladder electrode 104; the semiconductor crystal 101 is cylindrical, the anode 103 is circular or elliptic, and the anode 103 covers a partial area in the middle of the top surface 101-2; the first ladder electrode 104 is disposed on a first side 101-3 of the semiconductor crystal 101; the first ladder electrode 104 comprises a plurality of annular sub-electrodes uniformly disposed on the first side 101-3, and a gap is disposed between any two adjacent sub-electrodes thereof. Preferably, the sub-electrodes of the first ladder electrode 104 are parallel to the top surface 101-2 of the semiconductor crystal 101. The width of the individual sub-electrodes of the first ladder electrode 104 may be different. Preferably, the width of the individual sub-electrodes of the first ladder electrode 104 is identical. The rest is the same as the embodiment 1.

It needs to be noted that, in addition to this embodiment, the semiconductor crystal 101 may be semi-cylindrical in other preferred embodiments (not shown in the figure).

It needs to be noted that, in addition to this embodiment, the anode 103 may cover the full area of the top surface 101-2 in other preferred embodiments (not shown in the figure).

It needs to be noted that, in addition to this embodiment, in other preferred embodiments, the semiconductor detector 100 may comprise a first ladder electrode 104 and a second ladder electrode 105, and both the first ladder electrode 104 and the second ladder electrode 105 comprise a plurality of semi-annular sub-electrodes (not shown in the figure). Preferably, the positions of the sub-electrodes of the first ladder electrode 104 are opposite one by one to those of the sub-electrodes of the second ladder electrode 105, wherein two sub-electrodes with the same height forms one annulus, and the two sub-electrodes with the same height are provided with an opening at the connection thereof.

Embodiment 11

Figure 12:
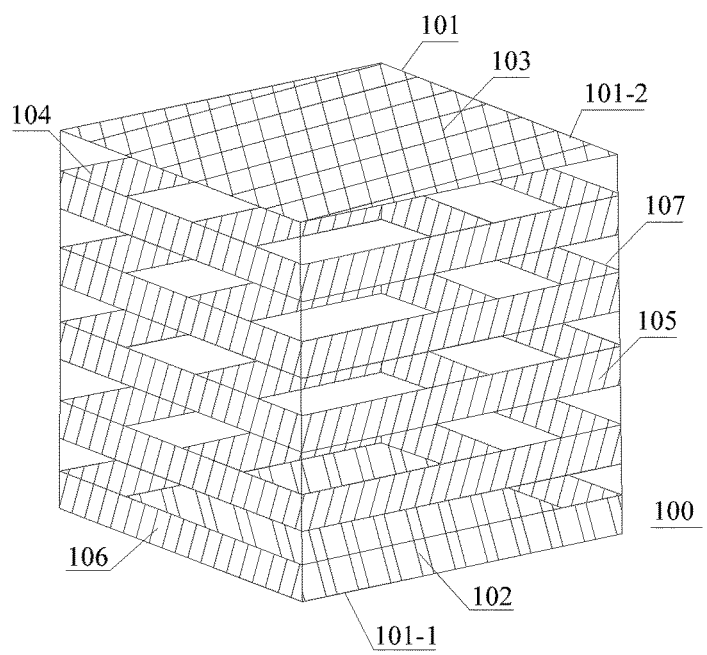
FIG. 12 is a structural schematic diagram of a semiconductor detector provided by an embodiment 11 of the invention.

As shown in FIG. 12, the differences between the semiconductor detector 100 provided by this embodiment and the embodiment 9 lie in that the anode 103 is rectangular, and the anode 103 covers the full area of the top surface 101-2 of the semiconductor crystal 101. The rest is the same as the embodiment 9.

Embodiment 12

Figure 13:
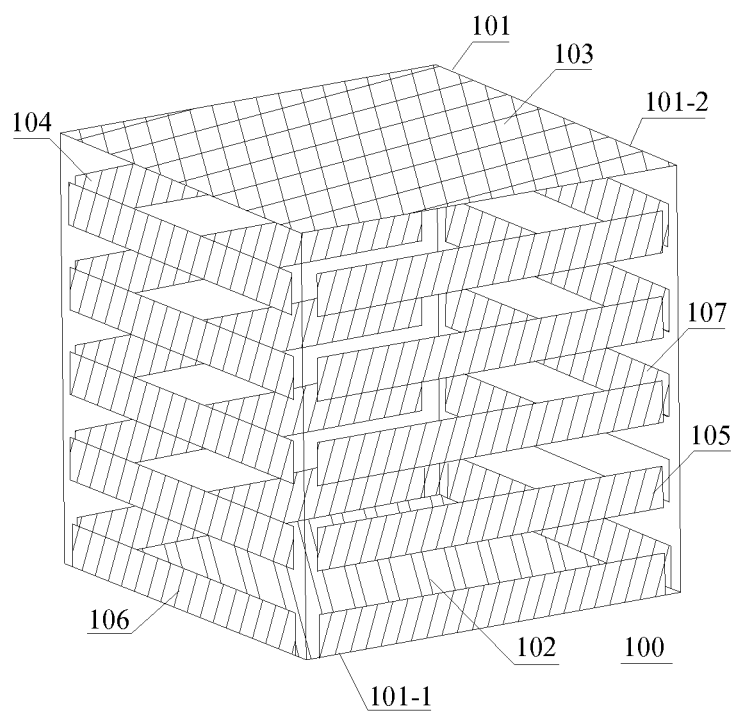
FIG. 13 is a structural schematic diagram of a semiconductor detector provided by an embodiment 12 of the invention.

As shown in FIG. 13, the differences between the semiconductor detector 100 provided by this embodiment and the embodiment 9 lie in that the anode 103 is rectangular, and the anode 103 covers the full area of the top surface 101-2 of the semiconductor crystal 101; sub-electrodes with the same height of the first ladder electrode 104, the second ladder electrode 105, the third ladder electrode 106 and the fourth ladder electrode 107 are separated from each other, namely, sub-electrodes with the same height of two ladder electrodes disposed on any two adjacent sides of the semiconductor crystal 101 are provided with openings at the connection of the two sides. The width of the individual sub-electrodes of the first ladder electrode 104 may be different. The width of the individual sub-electrodes of the second ladder electrode 105 may be different. The width of the individual sub-electrodes of the third ladder electrode 106 may be different. The width of the individual sub-electrodes of the fourth ladder electrode 107 may be different. Preferably, the width of the individual sub-electrodes of the first ladder electrode 104 is identical. The width of the individual sub-electrodes of the second ladder electrode 105 is identical. The width of the individual sub-electrodes of the third ladder electrode 106 is identical. The width of the individual sub-electrodes of the fourth ladder electrode 107 is identical. More preferably, the width of all the sub-electrodes of the first ladder electrode 104, the second ladder electrode 105, the third ladder electrode 106 and the fourth ladder electrode 107 is identical. The rest is the same as the embodiment 9.

The above embodiments are used only to illustrate the invention and not to limit the invention, and also various variations and modifications may be made by those of ordinary skills in the related art without departing from the spirit and scope of the invention, therefore, all equivalent technical solutions also pertain to the category of the invention. The patent protection scope should be defined by the claims.

The invention claimed is:

1. A semiconductor detector comprising: a single semiconductor crystal, a cathode, an anode and at least one ladder electrode;

The single semiconductor crystal comprising a top surface, a bottom surface and at least one lateral surface; the cathode, the anode and the ladder electrode being conductive thin films deposited on the single semiconductor crystal;

the cathode being disposed on the bottom surface of the single semiconductor crystal; the anode being disposed on the top surface of the single semiconductor crystal; the ladder electrode being uniformly disposed on an entire lateral surface of the single semiconductor crystal; and the ladder electrode comprising a plurality of sub-electrodes.

2. The semiconductor detector of claim 1, characterized in that, the shape of the single semiconductor crystal is a cuboid.

3. The semiconductor detector of claim 2, wherein the anode is rectangular and covers a partial area at a middle position of the top surface;
wherein the semiconductor detector comprises a first ladder electrode and a second ladder electrode;
wherein the first ladder electrode and the second ladder electrode are disposed respectively on an entire first lateral surface and an second lateral surface of the single semiconductor crystal with their positions being opposite.

4. The semiconductor detector of claim 3, wherein the cathode covers the bottom surface completely.

5. The semiconductor detector of claim 3, wherein the cathode comprises
a plurality of rectangular sub-electrodes uniformly disposed on the bottom surface, and
a gap is disposed between any two adjacent sub-electrodes thereof.

6. The semiconductor detector of claim 5, wherein either the long sides of a sub-electrode of the cathode are parallel to the long sides of the anode; or,
the long sides of a sub-electrode of the cathode are perpendicular to the long sides of the anode.

7. The semiconductor detector of claim 3,
wherein the first ladder electrode comprises a plurality of rectangular sub-electrodes uniformly disposed on the entire first lateral surface, and a gap is disposed between any two adjacent sub-electrodes thereof;
wherein the second ladder electrode comprises a plurality of sub-electrodes uniformly disposed on the entire second lateral surface, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

8. The semiconductor detector of claim 3,
wherein the first ladder electrode comprises a plurality of rectangular sub-electrodes uniformly disposed on the entire first lateral surface and in a partial area of the top surface adjacent to the first lateral surface, and a gap is disposed between any two adjacent sub-electrodes thereof;
wherein the second ladder electrode comprises a plurality of sub-electrodes uniformly disposed on the entire second lateral surface and in a partial area of the top surface adjacent to the second lateral surface, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

9. The semiconductor detector of claim 3, wherein the edges where the bottom surface of the single semiconductor crystal joins the first lateral surface and the second lateral surface are chamfered, and the cathode covers the chamfered bottom surface of the single semiconductor crystal completely.

10. The semiconductor detector of claim 9,
wherein the first ladder electrode comprises a plurality of rectangular sub-electrodes uniformly disposed on the entire first lateral surface, and a gap is disposed between any two adjacent sub-electrodes thereof;
wherein the second ladder electrode comprises a plurality of sub-electrodes uniformly disposed on the entire second lateral surface, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

11. The semiconductor detector of claim 1, wherein the profile of the single semiconductor crystal is fan-shaped, the bottom surface is an arc-shaped surface, the top surface is rectangular, and the anode is disposed on the top surface and covers the top surface completely.

12. The semiconductor detector of claim 11,
wherein the semiconductor detector comprises a first ladder electrode and a second ladder electrode; and
wherein the first ladder electrode and the second ladder electrode are disposed respectively on an entire first lateral surface and an entire second lateral surface of the single semiconductor crystal with their positions being opposite.

13. The semiconductor detector of claim 12,
wherein the first ladder electrode comprises a plurality of rectangular sub-electrodes uniformly disposed on the entire first lateral surface, and a gap is disposed between any two adjacent sub-electrodes thereof;
wherein the second ladder electrode comprises a plurality of sub-electrodes uniformly disposed on the entire second lateral surface, the number and shape of the sub-electrodes of the second ladder electrode are the same as those of the sub-electrodes of the first ladder electrode, and the positions of the sub-electrodes of the second ladder electrode are opposite one by one to those of the sub-electrodes of the first ladder electrode.

14. The semiconductor detector of claim 2,
wherein the anode is circular or elliptic and covers a partial area at a middle position of the top surface;
wherein the cathode covers the bottom surface completely;
wherein the semiconductor detector comprises a first ladder electrode, a second ladder electrode, a third ladder electrode, and a fourth ladder electrode;
wherein the first ladder electrode and the second ladder electrode are disposed respectively on an entire first lateral surface and an entire second lateral surface of the single semiconductor crystal with their positions being opposite, and the third ladder electrode and the fourth ladder electrode are disposed respectively on an entire third lateral surface and an entire fourth lateral surface of the single semiconductor crystal with their positions being opposite.

15. The semiconductor detector of claim 14,
wherein the first ladder electrode comprises a plurality of rectangular sub-electrodes uniformly disposed on the entire first lateral surface, and a gap is disposed between any two adjacent sub-electrodes thereof;
wherein the second ladder electrode, the third ladder electrode and the fourth ladder electrode in turn comprise a plurality of sub-electrodes uniformly disposed on the entire second lateral surface, the entire third lateral surface and the entire fourth lateral surface respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode;
wherein sub-electrodes with the same height of the first ladder electrode, the second ladder electrode, the third ladder electrode and the fourth ladder electrode are connected with each other to form a loop.

16. The semiconductor detector of claim 1, wherein the shape of the single semiconductor crystal is a cylinder.

17. The semiconductor detector of claim 16,
wherein the anode is circular or elliptic and covers a partial area at a middle position of the top surface;
wherein the cathode covers the bottom surface completely;
wherein the semiconductor detector comprises a first ladder electrode; and
wherein the first ladder electrode is disposed on an entire first lateral surface of the single semiconductor crystal.

18. The semiconductor detector of claim 17,
wherein the first ladder electrode comprises a plurality of annular sub-electrodes uniformly disposed on the entire first lateral surface, and a gap is disposed between any two adjacent sub-electrodes thereof;
wherein the sub-electrodes of the first ladder electrode are parallel to the top surface.

19. The semiconductor detector of claim 2,
wherein the anode is rectangular and covers the top surface completely; the cathode covers the bottom surface completely;

wherein the semiconductor detector comprises a first ladder electrode, a second ladder electrode, a third ladder electrode, and a fourth ladder electrode;

wherein the first ladder electrode and the second ladder electrode are disposed respectively on an entire first lateral surface and an entire second lateral surface of the single semiconductor crystal with their positions being opposite, and the third ladder electrode and the fourth ladder electrode are disposed respectively on an entire third lateral surface and an entire fourth lateral surface of the single semiconductor crystal with their positions being opposite.

20. The semiconductor detector of claim 19, wherein the first ladder electrode comprises a plurality of rectangular sub-electrodes uniformly disposed on the entire first lateral surface, and a gap is disposed between any two adjacent sub-electrodes thereof;

wherein the second ladder electrode, the third ladder electrode and the fourth ladder electrode in turn comprise a plurality of sub-electrodes uniformly disposed on the entire second lateral surface, the entire third lateral surface and the entire fourth lateral surface respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode;

wherein sub-electrodes with the same height of the first ladder electrode, the second ladder electrode, the third ladder electrode and the fourth ladder electrode are connected with each other to form a loop.

21. The semiconductor detector of claim 19, wherein the first ladder electrode comprises a plurality of rectangular sub-electrodes uniformly disposed on the entire first lateral surface, and a gap is disposed between any two adjacent sub-electrodes thereof;

wherein the second ladder electrode, the third ladder electrode and the fourth ladder electrode in turn comprise a plurality of sub-electrodes uniformly disposed on the entire second lateral surface, the entire third lateral surface and the entire fourth lateral surface respectively, the number and shape of the sub-electrodes of the second ladder electrode, the third ladder electrode and the fourth ladder electrode are the same as those of the sub-electrodes of the first ladder electrode, and the positions of the sub-electrodes of the second ladder electrode are opposite one by one to those of the sub-electrodes of the first ladder electrode, the positions of the sub-electrodes of the third ladder electrode are opposite one by one to those of the sub-electrodes of the fourth ladder electrode;

wherein sub-electrodes with the same height of two of the ladder electrodes disposed on any two adjacent ones of the lateral surfaces of the single semiconductor crystal are provided with openings at the connection of the two lateral surfaces.

22. The semiconductor detector of claim 1, wherein the material of the single semiconductor crystal comprises either $HgI_2$, GaAs, TiBr, CdTe, CdZnTe, CdSe, GaP, HgS, $PbI_2$, or AlSb; or, the material of the cathode, the anode and the ladder electrode comprises Au, Pt, Ag, Cu, Al or ITO.

* * * * *